United States Patent

[11] 3,580,114

| [72] | Inventor | Walter J. Rozmus |
| | | Hubbardsville, N.Y. |
| [21] | Appl. No. | 734,984 |
| [22] | Filed | June 6, 1968 |
| [45] | Patented | May 25, 1971 |
| [73] | Assignee | Utica Tool Company, Inc. |
| | | Orangeburg, S.C. |

[54] WIRE-STRIPPING APPARATUS
27 Claims, 6 Drawing Figs.

[52] U.S. Cl. .................................................... 81/9.5
[51] Int. Cl. ................................................ H02g 1/12
[50] Field of Search........................................... 81/9.5 (C),
9.5 (M); 30/91.2, 364, 90.8; 83/924

[56] References Cited
UNITED STATES PATENTS

| 2,407,233 | 9/1946 | Greer et al. | 81/9.5(M)X |
| 2,807,705 | 9/1957 | Arraim | 81/9.5UX |

FOREIGN PATENTS

| 93,230 | 1/1960 | Netherlands | 30/91.2 |
| 593,265 | 2/1934 | Germany | 30/91.2 |

*Primary Examiner*—Lester M. Swingle
*Assistant Examiner*—Roscoe V. Parker, Jr.
*Attorney*—Harness, Dickey and Pierce ABSTRACT: An apparatus for removing or stripping the insulation from a wire and comprising a pair of plierslike lever members pivotably connected to one another and defining engageable jaw sections and manually grippable handle sections; a pair of rotatable stripper members mounted one on each of the jaw sections with each stripper member comprising a plurality of stripping elements; the elements on one of the stripper members corresponding to and adapted to be operatively associated with the stripping elements on the other stripper member; shaft means rotatably supporting the stripper members and means for effecting simultaneous rotation of the shaft means and stripper members thereon, whereby corresponding stripping elements may be moved into confronting cooperable relation; spring means for resiliently urging the jaw sections apart and for providing an audible signal in response to preselected rotational movement of the shaft means, and guide means on the forward ends of the jaw sections for guiding the wire from which insulation is to be stripped during relative axial movement of the wire with respect to the stripping apparatus.

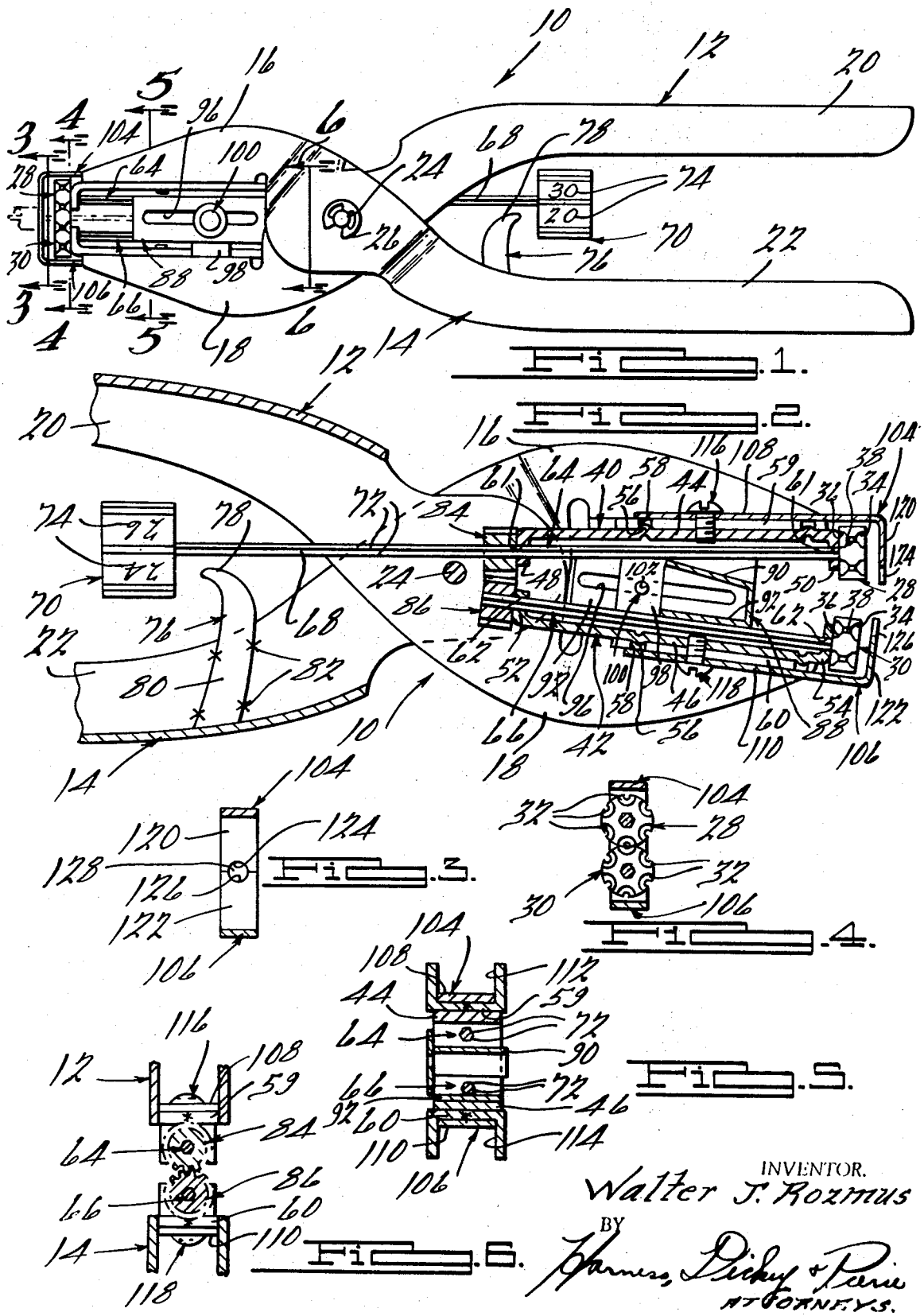

WIRE-STRIPPING APPARATUS

BACKGROUND OF THE INVENTION

For many applications, it is of utmost importance that an electrical wire be free from cuts, nicks, and similar surface abrasions. Accordingly, it is of considerable importance when stripping insulation from such wire to avoid nicking or cutting the wire during the stripping operation. It has been observed that in many instances, even though the insulation is not initially sheared completely through by the stripping or shearing blades of heretofore-known and used wire-stripping tools, where the insulation is pulled free of the wire by moving the wire and the stripping apparatus relative to one another, the surface of the wire frequently becomes damaged. Such surface damage of many types of wire utilized in miniature circuits may be acute, especially if the components are subject to vibration where a nick may result in the formation of a stress concentration followed by early failure. Also, where current must be delivered in extremely accurate amounts, a nick or similar-type surface abrasion on the wire cannot be tolerated due to the fact that the resistance of the wire may be affected.

The present invention is directed toward a new and improved wire-stripping tool which is adapted to function in effectively removing insulation from a wire in an extremely effortless and simple manner such that the possibility of nicking, breaking the strands of a wire conductor or similarly damaging the wire is positively eliminated. More particularly, the present invention is directed toward a wire-stripping tool which is provided with a plurality of insulation-stripping elements and cooperable guide means which permit effective shearing of the insulation wire and subsequent removal of this insulation in a manner such that the wire is moved along a preselected axial path relative to the stripping elements by the guide means, thereby preventing any damage to the wire by the stripping elements.

SUMMARY OF THE INVENTION

This invention relates generally to hand-operated tools, and, more particularly, to a new and improved hand-operated wire-stripping tool.

It is accordingly a primary object of the present invention to provide a new and improved wire-stripping tool.

It is a more particular object of the present invention to provide a new and improved wire-stripping tool incorporating a pair of wire-stripping members which are rotatably mounted in a manner such that cooperable stripping elements thereon may be adjustably positioned into confronting cooperable relation preparatory to a stripping operation.

It is a related object of the present invention to provide a wire-stripping tool of the above character wherein the stripping elements correspond to various wire sizes, and wherein the stripper members may be easily adjusted so that the appropriate stripping elements may be used for stripping the insulation off from the various size wires.

It is yet another object of the present invention to provide a wire-stripping apparatus of the above type which includes guide means for guiding a wire for relative movement with respect to the apparatus and hence prevent inadvertent damage to the wire during a stripping operation.

It is still another object of the present invention to provide a wire-stripping apparatus of the above character which is of an extremely simple design, is easy to assemble, and will have a long and durable operational life.

Other objects and advantages of the present invention will become apparent from the following detailed description taken in conjunction with the accompanying drawing.

BRIEF DESCRIPTION OF THE DRAWING

FIG. 1 is a side elevational view of a preferred embodiment of the wire-stripping apparatus of the present invention;

FIG. 2 is an enlarged fragmentary view of a portion of the apparatus illustrated in FIG. 1, as shown with the jaw sections thereof in an open position;

FIG. 3 is a transverse cross-sectional view taken substantially along the line 3–3 of FIG. 1;

FIG. 4 is a transverse cross-sectional view taken substantially along the line 4–4 of FIG. 1;

FIG. 5 is a transverse cross-sectional view taken substantially along the line 5–5 of FIG. 1, and FIG. 6 is a fragmentary transverse cross-sectional view taken substantially along the line 6–6 of FIG. 1.

DETAILED DESCRIPTION OF A PREFERRED EMBODIMENT

For purposes of clarity, the terms "inwardly" and "outwardly" and derivatives thereof will have reference to the geometric center of the wire-stripping apparatus of the present invention and the various components thereof. Similarly, the terms "forwardly" and "rearwardly" will have reference to the apparatus of the present invention as shown in FIGS. 1 and 2, with the forward end of the apparatus being located at the left side of FIG. 1 and at the right side of FIG. 2.

Referring now in detail to the drawing, a wire-stripping apparatus 10 in accordance with a preferred construction of the present invention, is shown as being of a generally plierslike construction and comprises a pair of pivotably connected cross lever members 12 and 14. The members 12, 14 include jaw sections 16 and 18, respectively, and manually engageable handle sections 20 and 22, respectively, the members 12, 14 being pivotably connected by means of a suitable pivot pin or the like 24 which is secured to the members 12, 14 by suitable snap ring means 26. As will be apparent, movement of the handle sections 20, 22 between the closed position shown in FIG. 1 and the open position shown in FIG. 2 will result in corresponding movement of the jaw sections 16, 18.

The wire-stripping apparatus 10 is provided with a pair of identical wire stripper members, generally designated 28 and 30, which are best illustrated in FIGS. 2 and 4 as being generally cylindrical in shape. The members 28, 30 are provided with a plurality of stripping elements 32 around the outer peripheries thereof, with corresponding elements 32 on the members 28, 30 being adapted to cooperate in a manner so as to effect shearing the insulation on an electrical wire or the like. More particularly, each of the stripping elements 32 comprises a pair of cup-shaped recessed portions 34 and 36 which extend axially inwardly from the opposite sides of the stripper members 28, 30 and which define a generally semicircular shearing edge 38 therebetween. As will later be described, the stripper members 28, 30 are mounted on the members 12 and 14 such that when the handle sections 20, 22 are biased toward one another, the member 28, 30 are moved into abutting engagement with one another, whereby cooperable shearing edges 38 of the elements 32 define an annular edge adapted to shear the insulation on a wire. The elements 32 of the stripper member 28 are identical to those on the member 30, and the elements 32 on each of the members 28, 30 are preferably of varying size to correspond with different sizes of wire. That is, the stripper members 28, 30 are provided with a plurality of pairs of corresponding stripping elements 32 which, when properly positioned relative to one another, provide a series of different size shearing edges 38. The stripper members 28, 30 illustrated herein are provided with six stripping elements 32; however, it will be readily apparent that the members 28, 30 may be provided with more or less of such elements 32, depending upon the size wire that the apparatus 10 is intended to strip insulation from. In a preferred construction of the present invention, each of the corresponding pair of stripping elements 32 on the stripper members 28, 30 are dimensioned such that the annular shearing edges 38 defined thereby are slightly larger in diameter than the diameter of the wire from which insulation is to be stripped so that during an insulation-stripping operation, the actual wire from which the insulation is to be stripped is not in any way nicked or otherwise damaged.

The lever members 14 and 12 are provided with a pair of generally C-shaped support brackets 40 and 42, respectively, which comprise longitudinally extending portions 44 and 46 and end portions 48, 50 and 52, 54, respectively, that are disposed at substantially right angles with respect to the portions 44, 46. The bracket portions 44 and 46 are provided with locating detents 56 that are adapted to be nestingly received within suitable positioning apertures 58 in a pair of longitudinally extending portions 59 and 60 of the jaw sections 16 and 18, respectively. As illustrated in FIG. 2, the support brackets 40 and 42 are adapted to be operatively secured to the lever members 14 and 12 in a manner later to be described such that the portions 44, 46 thereof are in abutting, substantially coplanar relationship with the lever member portions 59, 60.

The end portions 48, 50 of the support bracket 40 are provided with a pair of aligned openings or apertures 61, and in a similar manner, the end portions 52, 54 of the support bracket 42 are provided with a pair of aligned openings or apertures 62. The openings 61, 62 are adapted to receive and journal support a pair of elongated actuating shafts 64 and 66 which have the stripper members 28 and 30 fixedly mounted on the forward ends thereof, as shown in FIG. 3. It will be seen that the ends of the shaft 66 terminate directly forwardly and rearwardly of the end portions 52, 54 of the support bracket 42, and that the forward end of the shaft 64 likewise terminates directly forwardly of the end portion 50 of the support bracket 40; however, the shaft 64 extends rearwardly a substantial distance from the end portion 48 of the support bracket 40, as seen at 68, and has a manually engageable adjustment knob 70 fixedly attached to the rearward end thereof.

The shafts 64 and 66 are generally polygonal in transverse section, as seen in FIGS. 4 and 5, and thus define a plurality of elongated facets or face portions, generally designated 72. The number of face portions 72 on each of the shafts 64, 66 correspond to the number of stripping elements 32 on the stripper members 28, 30, i.e., the shafts 64, 66 are provided with six faces in the embodiment shown herein. The stripper members 28, 30 are mounted on the ends of the shafts 64, 66 such that each of the stripping elements 32 thereof are aligned with one of the faces 72, with the result that when the shafts 64, 66 are rotatably positioned such that preselected faces 72 thereon confront one another, the corresponding stripping elements 32 on the stripper members 28, 30 confront one another and are adapted to cooperate in effecting the removal of insulation from a suitable wire, as will later be described. The knob 70 is provided with suitable indicia 74 which corresponds to the respective sizes of the stripping elements 32, and a suitable visual indicator member 76 having a substantially pointed upper end portion 78 is provided on the lever member 14. When the indicia 74 indicating a particular size wire is aligned with the member 76, the appropriate stripping elements 32 of the stripper members 28, 30 are in cooperable confronting relation on the ends of the shafts 64, 66. As best illustrated in FIG. 2, the indicator member 76 comprises a lower end portion 80 which is fixedly secured to the lever member 14, as by spot welding or the like, shown at 82.

In accordance with the principles of the present invention, means is provided on the apparatus 10 for simultaneously rotating the shafts 64, 66 and hence the stripper members 28, 30 mounted thereon. Such means is provided by a pair of meshingly engageable gear members 84 and 86 which are fixedly secured to the shafts 64, 66 directly rearwardly of the end portions 48, 52 of the support brackets 40, 42. It will be seen that upon rotation of the knob 70, the shaft 64 will rotate, thereby effecting rotation of the gear member 84. Upon such rotation of the gear member 84, the gear member 86 will simultaneously rotate, thereby effecting rotation of the shaft 66. By properly orienting the stripper members 28, 30 on the ends of the shafts 64, 66, the stripping elements 32 of the stripper members 28, 30 which correspond with one another and with the indicia 74 on the knob 70 will be moved into confronting relationship upon proper rotation of the knob 70.

The wire-stripping apparatus 10 is provided with means for effecting opening movement of the jaw sections 16, 18 upon release of manual force on the handle sections 20, 22, thereby obviating the need for the operator to open the jaw sections 16, 18 after each stripping operation. Such means is provided by a spring member 88 which is provided with a pair of spaced rearwardly diverging resilient flanges 90 and 92 which are disposed interjacent the shafts 64, 66. The spring member 88 also comprises a longitudinally extending support section 94 which is disposed at substantially right angles to the flanges 90, 92 and is formed with an elongated slot 96. The member 88 is adapted to be operatively secured to the jaw section 18 of the lever member 12 by means of an upwardly extending support tab 98 that is integrally formed along one side of the support bracket 42. An adjustment screw 100 extends through the slot 96 and is threadably received within a suitable aperture 102 in the tab 98 for fixedly securing the spring member 88 thereto.

As illustrated in FIG. 3, the spring flanges 90, 92 engage and exert an outwardly directed force against the shafts 64, 66, with the result that the flanges 90, 92 function to force the jaw sections 16, 18 apart, as previously mentioned. Over and above the function of opening the jaw sections 16, 18 the spring flanges 90, 92 are adapted to function in providing for positive alignment of the faces 72 on the shafts 64, 66 and hence positive alignment of the stripping elements 32 on the stripper members 28, 30. Moreover, the flanges 90, 92 are adapted to provide an audible clicking sound upon rotation of the shafts 64, 66 to enable the operator to audibly note the number of stripping elements 32 that are successively rotated into confronting relation and also note the exact moment when preselected stripping elements 32 are disposed in confronting relationship with one another. It will be noted that the spring member 88 may be moved a limited amount longitudinally of the shafts 64, 66 and be fixedly secured at any preselected position by suitable loosening and tightening of the adjustment screw 100. With this construction, the generally transversely extending portion of the member 88 which integrally connects the forwardmost ends of the spring flanges 90, 92 is adapted to act as an adjustable stop means or gauge for controlling the length of wire from which insulation is stripped upon operation of the apparatus 10. That is, the member 88 may be adjustably positioned longitudinally of the apparatus 10 so that the forward end thereof is spaced a predetermined distance away from the stripping elements 32, this distance being equal to the length of wire from which insulation is to be stripped. Thus, after the member 88 is properly positioned, the end of a wire which is to have insulation stripped therefrom is inserted longitudinally between the stripping elements 32 until the end of the wire abuts against the forward end of the member 88, at which time the wire will be located at the exact position relative to the elements 32 so that upon actuation of the apparatus 10, some predetermined amount of insulation will be stripped from the wire.

As best seen in FIGS. 1 through 3, the wire-stripping apparatus 10 of the present invention is provided with means for guiding a section of wire for movement relative to the stripper members 28, 30 as insulation is being stripped from the wire. More particularly, such guide means is provided by a pair of generally L-shaped guide members 104 and 106 which comprise longitudinally extending sections 108 and 110 that are nestingly received in recessed portions 112 and 114 of the jaw sections 16 and 18, respectively, (see FIG. 5). The guide member sections 108 and 110 are adapted to be fixedly secured to the jaw sections 16 and 18 by means of suitable screws, bolts or the like 116 and 118 which also function to fixedly secure the support brackets 40 and 42 to the portions 59, 60 of the lever members 14 and 12. The forwardmost ends of the guide members 104 and 106 are provided with inwardly projecting guide sections 120 and 122 which extend perpendicular to the support sections 108 and 110. As best illustrated in FIG. 3, the guide sections 120 and 122 are formed with semicircular guide recesses 124 and 126 on the confronting ends thereof, which recesses 124, 126 are adapted to define an annular opening 128 at such time as the jaw sections 16 and 18 are biased to their respective closed positions. The guide sections 120, 122 are spaced directly forwardly from the stripper members 28 and 30 and the opening 128 is adapted to be coaxially aligned with the confronting and cooperable pairs of stripping elements 32 at such time as the apparatus 10 is actuated. The guide members 104 and 106 are adapted to function in guiding a section of wire from which insulation is being stripped in a manner such that in the event the wire is moved axially of the opening 128 and stripping elements 32, the wire will not be damaged in any way during the stripping operation, as will hereinafter be described.

In operation, when it is desired to strip the insulation off from a section of wire, for example, off from one end thereof, the stripping apparatus 10 is initially adjusted such that the jaw sections 16, 18 are open, as seen in FIG. 2, and the adjustment knob 70 is rotated until the indicia 74 on the knob 70 which corresponds to the size wire which is to be stripped is aligned with the indicator member 76. Upon rotation of the knob 70, the shaft 64 will rotate in a predetermined manner, thereby rotating the gear members 84 and 86 and the shaft 66. By virtue of the fact that the stripper members 28 and 30 are fixedly attached to the forward ends of the shafts 64 and 66, said members 28, 30 are also rotated until the preselected stripping elements 32 thereof are arranged in confronting cooperable relationship. Thereafter, the end of the wire which is to be stripped is inserted interjacent the stripper members 28, 30 in a manner such that the wire is in substantial axial alignment with the guide recesses 124, 126 and the recessed portions 34, 36 and shearing edges 38 of the cooperating stripping elements 32.

Thereafter, the handle sections 20 and 22 of the lever members 12 and 14 are biased from the position shown in FIG. 2 to the position shown in FIG. 1, at which time the stripper members 28, 30 are moved toward and into engagement with the portion of wire in alignment therewith. As the stripper members 28, 30 move into engagement with the wire, the shearing edges 38 of the confronting stripping elements 32 shear or cut the insulation around the wire, but since the diameter of the shearing edges 38 are selected so as to be slightly larger than the diameter of the wire, only the insulation is sheared and the wire remains undamaged. After the insulation has thus been sheared, the apparatus 10 is moved axially of the wire, and the section of insulation that has been sheared on the wire is thus pulled axially off from the wire. By virtue of the provision of the guide members 104 and 106, in the event the apparatus 10 and wire are moved away from each other at an angle from the axis of the guide opening 128 and shearing edges 38, the portion of the wire which was disposed between the guide sections 120, 122 and the stripper members 28, 30 will move axially outwardly from the stripper members 28 and 30. Thus, even though the wire moves relative to the apparatus 10 at an angle, no lateral force is exerted against the stripper members 28, 30 since the portion of the wire adjacent the members 28, 30 must move axially therefrom due to the guide members 104, 106. Accordingly, the wire itself will not be nicked, scratched or damaged in any other way. After the section of insulation is thus removed, the handle sections 20 and 22 of the lever members 12 and 14 may be biased from the closed position shown in FIG. 1 to the open position illustrated in FIG. 2, at which time the jaw sections 16 and 18 will be opened preparatory to the next stripping operation.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. An apparatus for stripping insulation from electrical wires and the like, comprising
   a pair of stripper members each including a plurality of insulation stripping elements,
   each of said elements on one of said stripper members corresponding to and adapted to be operatively associated with one of said elements on the other of said stripper members, and
   means including shaft means for simultaneously rotatably supporting and aligning said stripper members whereby the corresponding insulation-stripping elements thereof may be rotated into confronting operative relation.

2. An apparatus as set forth in claim 1 wherein said means for rotating said shaft means comprises drivingly engageable gear means on said shaft means.

3. In a wire-stripping apparatus,
   a pair of relatively movable jaws,
   a pair of insulation stripper members adjustably mounted one on each of said jaws, each of said stripper members comprising at least two insulating stripping elements each of which is adapted to cooperate with one of the elements on the other of said stripper members,
   means for selectively moving said jaw members toward and away from one another and thereby operatively positioning said stripper members, and
   means for simultaneously rotatably adjusting said stripper members to orient cooperating stripping elements thereon in confronting relation with one another.

4. An apparatus as set forth in claim 3 which includes a pair of pivotably mounted lever members, each of said lever members having a manually engageable handle section and a jaw section, whereby movement of said handle sections effects simultaneous movement of said jaw sections toward one another.

5. An apparatus as set forth in claim 3 wherein each of said stripping elements comprises an insulation-shearing edge adapted to cooperate with the shearing edges of a corresponding stripping element.

6. An apparatus as set forth in claim 3 which includes spring means for resiliently resisting closing movement of said jaws.

7. An apparatus as set forth in claim 3 which includes guide means adjacent said stripper members, whereby a portion of wire between said stripper members and said guide means is moved axially of said stripper members upon relative movement of the wire with respect to the apparatus.

8. An apparatus as set forth in claim 7 wherein said guide means is mounted on said jaws.

9. In an apparatus for stripping insulation from electrical wires and the like,
   a pair of relatively movable jaw members,
   a pair of stripper members mounted one on each of said jaw members and each comprising a plurality of cooperable insulation-stripping elements,
   each of said elements on one of said stripper members corresponding to and adapted to be operatively associated with one of said elements on the other of said stripper members,
   means for moving said jaw members toward and away from an actuatable position wherein cooperable elements of said stripper members provide an insulation-shearing edge, and
   means for simultaneously rotatably adjusting said stripper members to orient cooperating stripping elements thereon in confronting relation with one another.

10. An apparatus as set forth in claim 9 which includes a pair of pivotably mounted lever members, each of said lever members having a manually engageable handle section and a jaw section, whereby movement of said manually engageable handle sections effects simultaneous movement of said jaw sections.

11. An apparatus as set forth in claim 10 which includes guide means on said lever members.

12. An apparatus for stripping insulation from electrical wires and the like, comprising
   a pair of stripper members each including a plurality of insulation-stripping elements,
   each of said elements on one of said stripper members corresponding to and adapted to be operatively associated with one of said elements on the other of said stripper members, means for rotatably supporting said stripper members, and means for simultaneously rotatably adjusting said stripper members to orient cooperating stripping elements thereon in confronting relation with one another.

13. An apparatus as set forth in claim 12 wherein each of said stripping elements comprises an insulation-shearing edge adapted to cooperate with the shearing edge of a corresponding stripping element.

14. An apparatus as set forth in claim 12 which includes guide means adjacent said stripper members, whereby a portion of wire between said stripper members and said guide means is moved axially of said stripper members upon relative movement of the wire with respect to the apparatus.

15. An apparatus for stripping insulation from electrical wires and the like, comprising
a pair of stripper members each including a plurality of insulation-stripping elements,
each of said elements on one of said stripper members corresponding to and adapted to be operatively associated with one of said elements on the other of said stripper members,
means for rotatably supporting said stripper members whereby the corresponding insulation-stripping elements thereof may be simultaneously rotated into confronting operative relation,
first shaft means for rotatably supporting one of said stripper members and second shaft means for rotatably supporting the other of said stripper members,
manually engageable means for effecting rotation of said shaft means, and
gear means for drivingly connecting said first and second shaft means, whereby rotation of said manually engageable means effects simultaneous rotation of said first and second shaft means and selective positioning of said stripping elements on said stripper members.

16. In a wire-stripping apparatus,
a pair of relatively movable jaws,
a pair of insulation stripper members adjustably mounted one on each of said jaws,
each of said stripper members comprising at least two insulating stripping elements each of which is adapted to cooperate with one of the elements on the other of said stripper members,
shaft means for selectively rotatably supporting said jaw members, and
means for simultaneously rotatably adjusting said stripper members to orient cooperating stripping elements thereon in confronting relation with one another.

17. An apparatus as set forth in claim 16 which includes drivingly engageable gear means on said shaft means.

18. An apparatus as set forth in claim 17 which includes first shaft means for rotatably supporting one of said stripper members and second shaft means for rotatably supporting the other of said stripper members, which includes manually engageable means for effecting rotation of said shaft means, and gear means for drivingly connecting said first and second shaft means, whereby rotation of said manually engageable means effects simultaneous rotation of said first and second shaft means and selective positioning of said stripping elements on said stripper members.

19. In an apparatus for stripping insulation from electrical wires and the like,
a pair of relatively movable jaw members,
a pair of stripper members mounted one on each of said jaw members and each comprising a plurality of cooperable insulation-stripping elements,
each of said elements on one of said stripper members corresponding to and adapted to be operatively associated with one of said elements on the other of said stripper members,
means for moving said jaw members toward and away from an actuatable position wherein cooperable elements of said stripper members provide an insulation-shearing edge,
shaft means for rotatably supporting said stripper elements interjacent said jaw members and means for simultaneously rotatably adjusting said stripper members to orient cooperating stripping elements thereon in confronting relation with one another.

20. In an apparatus for stripping insulation from electrical wires and the like,
a pair of pivotably mounted lever members each comprising a manually engageable handle section and a jaw section,
a pair of stripper members mounted one on each of said jaw sections and each comprising a plurality of cooperable insulation-stripping elements,
each of said elements on one of said stripper members corresponding to and adapted to be operatively associated with one of said elements on the other of said stripper members,
means for moving said lever members toward and away from an actuatable position wherein cooperable elements of said stripper members provide an insulation-shearing edge,
first shaft means for rotatably supporting one of said stripper members and second shaft means for rotatably supporting the other of said stripper members, and
manually engageable means for effecting rotation of said shaft means, and gear means for drivingly connecting said first and second shaft means, whereby rotation of said manually engageable means effects simultaneous rotation of said first and second shaft means and selective positioning of said stripping elements on said stripper members.

21. An apparatus as set forth in claim 20 wherein said first and second shaft means each comprise a plurality of face portions, and which includes means for selectively aligning said face portions and thereby positioning corresponding stripping elements on said stripper members.

22. An apparatus as set forth in claim 21 which includes means for providing an audible signal upon preselected alignment of said face portions of said shaft means.

23. An apparatus as set forth in claim 20 which includes a spring member mounted on one of said lever members and comprising first and second resilient portions engageable with said face portions of said shaft means for selectively aligning said face portions and providing an audible signal upon alignment thereof.

24. An apparatus as set forth in claim 23 wherein said spring member is adjustably mounted on one of said lever members.

25. An apparatus as set forth in claim 20 wherein the corresponding stripping elements of said stripper members are of different sizes to correspond with different size insulated wire.

26. An apparatus as set forth in claim 25 which includes means providing a visual indication of the size of stripping elements on said stripper members which are disposed in confronting operative relation.

27. An apparatus as set forth in claim 20 which includes means resiliently resisting closing movement of said jaw sections of said lever members.